(12) United States Patent
Dede et al.

(10) Patent No.: US 8,736,128 B2
(45) Date of Patent: May 27, 2014

(54) THREE DIMENSIONAL MAGNETIC FIELD MANIPULATION IN ELECTROMAGNETIC DEVICES

(75) Inventors: Ercan Mehmet Dede, Ann Arbor, MI (US); Jaewook Lee, Ann Arbor, MI (US); Debasish Banerjee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 444 days.

(21) Appl. No.: 13/206,982

(22) Filed: Aug. 10, 2011

(65) Prior Publication Data

US 2013/0038147 A1    Feb. 14, 2013

(51) Int. Cl.
*H02K 1/00* (2006.01)
*H01F 13/00* (2006.01)
*H02K 1/08* (2006.01)
*H02K 19/10* (2006.01)

(52) U.S. Cl.
USPC .............. 310/191; 310/216.075; 318/701; 343/909; 335/236; 335/281; 361/143

(58) Field of Classification Search
CPC ................................. H01P 3/20; H01F 3/00
USPC ............. 310/46, 48, 49.43, 191, 216.074, 310/216.075, 166, 172; 343/909; 322/52; 335/284, 306, 236, 244; 342/1, 4–5; 361/143; 336/84 M
See application file for complete search history.

(56) References Cited

U.S. PATENT DOCUMENTS

| | | | |
|---|---|---|---|
| 1,161,819 A | 11/1915 | Grob | |
| 1,768,907 A | 7/1930 | Heinkel | |
| 1,817,763 A | 8/1931 | Purington | |
| 1,834,431 A | 12/1931 | Smith | |
| 2,540,022 A | 1/1951 | Rabenda | |
| 2,859,298 A | 11/1958 | Burch | |
| 3,281,739 A | 10/1966 | Grengg | |
| 3,772,540 A | 11/1973 | Benson | |
| 3,781,736 A * | 12/1973 | Parker | 335/304 |
| 3,987,646 A | 10/1976 | Knourek et al. | |
| 4,010,390 A | 3/1977 | Stampfli | |

(Continued)

OTHER PUBLICATIONS

M.F. Imani, A. Grbic, Near-field focusing with a corrugated surface, IEEE Antennas and Wireless Propagation Letters, vol. 8, 2009.

(Continued)

*Primary Examiner* — Burton Mullins
(74) *Attorney, Agent, or Firm* — Dinsmore & Shohl LLP (57) ABSTRACT

Electromagnetic devices and near field plates for three-dimensional magnetic field manipulation are disclosed. In one embodiment, an electromagnetic device includes a rotor, a stator, and a magnetic field focusing device. The rotor may include a rotor body and a plurality of radially extending rotor poles. The stator may include a plurality of stator poles radially extending inwardly from a stator body toward the rotor body. Each stator pole may have a magnetic flux generating device and a stator pole tip, wherein an air gap may be located between each stator pole tip and each corresponding rotor pole. The magnetic field focusing device is coupled to at least one stator pole tip and produces a magnetic field profile having at least one concentrated magnetic flux region proximate the stator pole tip. The magnetic field focusing device twists the magnetic field profile by an angle α.

20 Claims, 8 Drawing Sheets

(56) References Cited

U.S. PATENT DOCUMENTS

| | | | |
|---|---|---|---|
| 4,216,454 A | 8/1980 | Ohtani et al. | |
| 4,327,345 A | 4/1982 | Kelso et al. | |
| 4,381,490 A | 4/1983 | Peters | |
| 4,549,155 A * | 10/1985 | Halbach | 335/212 |
| 4,642,501 A | 2/1987 | Kral et al. | |
| 4,651,118 A | 3/1987 | Zeuner et al. | |
| 4,658,231 A | 4/1987 | Schwenzer et al. | |
| 4,698,537 A | 10/1987 | Byrne et al. | |
| 4,700,097 A | 10/1987 | Kawada et al. | |
| 4,751,415 A | 6/1988 | Kitamori et al. | |
| 4,849,666 A | 7/1989 | Hoag | |
| 4,918,831 A | 4/1990 | Kliman | |
| 4,967,464 A | 11/1990 | Stephens | |
| 5,138,291 A | 8/1992 | Day | |
| 5,220,228 A | 6/1993 | Sibata | |
| 5,239,277 A | 8/1993 | Vielot | |
| 5,428,257 A | 6/1995 | Lurkens | |
| 5,608,369 A | 3/1997 | Irgens et al. | |
| 5,668,430 A | 9/1997 | Kolomeitsev | |
| 5,747,912 A | 5/1998 | Sakuma et al. | |
| 5,781,090 A | 7/1998 | Goloff et al. | |
| 5,790,006 A * | 8/1998 | Abele et al. | 335/306 |
| 5,844,346 A | 12/1998 | Kolomeitsev et al. | |
| 5,852,335 A | 12/1998 | Suzuki et al. | |
| 5,886,442 A * | 3/1999 | Ogino et al. | 310/181 |
| 5,886,605 A | 3/1999 | Ulerich et al. | |
| 5,890,662 A | 4/1999 | Dykstra | |
| 5,945,761 A | 8/1999 | Sakuma | |
| 5,955,934 A | 9/1999 | Raj | |
| 5,969,589 A | 10/1999 | Raj | |
| 6,002,233 A | 12/1999 | McCann | |
| 6,066,904 A | 5/2000 | Fei et al. | |
| 6,072,260 A | 6/2000 | Randall | |
| 6,087,752 A | 7/2000 | Kim et al. | |
| 6,093,993 A | 7/2000 | McClelland | |
| 6,232,693 B1 | 5/2001 | Gierer et al. | |
| 6,249,198 B1 | 6/2001 | Clark et al. | |
| 6,501,359 B2 | 12/2002 | Matsusaka et al. | |
| 6,504,281 B1 * | 1/2003 | Smith et al. | 310/190 |
| 6,538,621 B1 * | 3/2003 | Sievenpiper et al. | 343/909 |
| 6,624,538 B2 | 9/2003 | Janisiewicz et al. | |
| 6,657,348 B2 | 12/2003 | Qin et al. | |
| 6,720,686 B1 | 4/2004 | Horst | |
| 6,731,191 B2 | 5/2004 | Lang et al. | |
| 6,768,051 B2 * | 7/2004 | Wiltshire et al. | 174/391 |
| 6,816,048 B2 | 11/2004 | Morita et al. | |
| 6,859,114 B2 * | 2/2005 | Eleftheriades et al. | 333/156 |
| 6,867,525 B2 | 3/2005 | Ionel et al. | |
| 6,937,127 B2 * | 8/2005 | Oster | 335/296 |
| 6,960,862 B2 | 11/2005 | Hill | |
| 6,967,424 B2 | 11/2005 | Popov | |
| 7,014,168 B2 | 3/2006 | Shimura et al. | |
| 7,034,427 B2 | 4/2006 | Hirzel | |
| 7,116,030 B2 | 10/2006 | Torok | |
| 7,182,051 B2 | 2/2007 | Sedda et al. | |
| 7,205,685 B2 | 4/2007 | Reichert et al. | |
| 7,350,763 B2 | 4/2008 | Hofling | |
| 7,420,308 B2 | 9/2008 | Ramu et al. | |
| 7,511,597 B2 | 3/2009 | Sata et al. | |
| 7,560,835 B2 | 7/2009 | Groening et al. | |
| 7,570,432 B1 * | 8/2009 | Yonak | 359/652 |
| 7,661,653 B2 | 2/2010 | Kondoh | |
| 7,710,225 B2 | 5/2010 | Uni | |
| 7,786,641 B2 | 8/2010 | Nishijima | |
| 7,982,567 B2 | 7/2011 | Cartier Millon et al. | |
| 8,003,965 B2 | 8/2011 | Grbic et al. | |
| 8,013,316 B2 | 9/2011 | Eleftheriades | |
| 8,013,698 B2 | 9/2011 | Bonjean et al. | |
| 2002/0057153 A1 | 5/2002 | Matsusaka et al. | |
| 2004/0155545 A1 | 8/2004 | Kaplan et al. | |
| 2006/0086396 A1 | 4/2006 | Ando | |
| 2006/0272714 A1 | 12/2006 | Carrillo et al. | |
| 2007/0152790 A1 | 7/2007 | Telep | |
| 2007/0267922 A1 | 11/2007 | Uni | |
| 2008/0276889 A1 | 11/2008 | Sfaxi et al. | |
| 2009/0021334 A1 | 1/2009 | Okada | |
| 2009/0065615 A1 | 3/2009 | Mizui et al. | |
| 2009/0167119 A1 | 7/2009 | Nakayama et al. | |
| 2009/0230333 A1 | 9/2009 | Eleftheriades | |
| 2009/0237014 A1 | 9/2009 | Yamada | |
| 2009/0303154 A1 | 12/2009 | Grbic et al. | |
| 2010/0008009 A1 | 1/2010 | Cartier-Millon et al. | |
| 2010/0052455 A1 | 3/2010 | Feng et al. | |
| 2010/0148598 A1 | 6/2010 | Kim et al. | |
| 2010/0231433 A1 | 9/2010 | Tishin et al. | |
| 2010/0264770 A1 | 10/2010 | Braun et al. | |
| 2010/0282223 A1 | 11/2010 | Czimmek et al. | |
| 2011/0031839 A1 * | 2/2011 | Fullerton et al. | 310/152 |
| 2012/0019432 A1 * | 1/2012 | Bowers et al. | 343/909 |
| 2012/0146752 A1 * | 6/2012 | Fullerton et al. | 335/306 |
| 2012/0206001 A1 | 8/2012 | Lee et al. | |
| 2012/0206226 A1 | 8/2012 | Lee et al. | |
| 2012/0262019 A1 * | 10/2012 | Smith et al. | 310/156.07 |
| 2013/0003245 A1 * | 1/2013 | Banerjee et al. | 361/143 |
| 2013/0135071 A1 * | 5/2013 | Roberts et al. | 335/306 |

OTHER PUBLICATIONS

A. Grbic, L. Jiang, R. Merlin, Near-field plates: subdiffraction focusing with patterned surfaces, Science, vol. 320, 2008.

A. Grbic, R. Merlin, Near-field focusing plates and their design, IEEE Transactions on Antennas and Propagation, vol. 56, 2008.

Lee, J., et al., "Topology optimization of switched reluctance motors for the desired torque profile," Struc Multidisc Optim, 42:783-796 (2010).

Mote, R.G. et al., "Near-field focusing properties of zone plates in visible regime—New insight," Optics Express, 16 (13): 9554-9564, 2008.

Li, J. et al., "The influence of propagating and evanescent waves on the focusing properties of zone plate structures," Optics Express, 17(21): 18462-18468, 2009.

Notice of Allowance received in related U.S. Appl. No. 13/492,087, mailed Jun. 27, 2013.

* cited by examiner

THREE DIMENSIONAL MAGNETIC FIELD MANIPULATION IN ELECTROMAGNETIC DEVICES

TECHNICAL FIELD

The present disclosure generally relates to magnetic field manipulation and, more particular, to three-dimensional magnetic field manipulation in electromagnetic devices, such as switched reluctance motors, to reduce torque ripple.

BACKGROUND

Electromagnetic devices, such as switched reluctance motors, have numerous applications. Desirable properties may include high average torque and low torque ripple, which is the amount of torque measured by subtracting the minimum torque during one revolution from the maximum torque from the same motor revolution. High torque ripple may negatively affect the efficiency and operation of the electromagnetic device.

Accordingly, alternative electromagnetic devices and approaches and devices that increase average torque and reduce torque ripple are desired.

SUMMARY

Embodiments of the present disclosure are directed to electromagnetic devices (e.g., switched reluctance motors) including one or more magnetic field focusing devices, such as a near field plate or a shaped magnetic element operable to manipulate a magnetic field distribution in three dimensions at an air gap between stator and rotor poles. Optimal magnetic field distribution may be designed using a gradient based optimization approach. The magnetic field focusing device may be designed to give any desired magnetic field distribution.

Previous applications of near field plates have included high frequency devices, in particular devices for which diffraction limiting is a serious problem. Near field plates have not previously been used in relatively low frequency magnetic devices, such as motors. The operating frequency of the motor may be on the order of kilohertz, for example in the range 100 Hz-10 kHz. A magnetic field focusing device such as a near field plate may be attached at the tip of each of the stator poles, so as to focus the magnetic field produced by the stator coil at specific desired locations.

A near field plate may be a thin grating-like device used to manipulate the electromagnetic field distribution. In some cases, it may be thought of as an impedance sheet having a modulated surface reactance. When a magnetic field passes from one side of the plate to the other side, the field distribution is modified to a desired configuration. The near field plate may be configured to manipulate the magnetic field distribution in three dimensions.

In one embodiment, an electromagnetic device includes a rotor, a stator, and a magnetic field focusing device. The rotor may include a rotor body and a plurality of radially extending rotor poles. The stator may include a plurality of stator poles radially extending inwardly from a stator body toward the rotor body. Each stator pole may have a magnetic flux generating device and a stator pole tip, wherein an air gap may be located between each stator pole tip and each corresponding rotor pole. The rotor is configured to rotate within the stator upon sequential energization of the magnetic flux generating device. The magnetic field focusing device is coupled to an end face of at least one stator pole tip and produces a magnetic field profile having at least one concentrated magnetic flux region proximate the stator pole tip within the air gap when an associated magnetic flux generating device is energized. The magnetic field focusing device is configured to twist the magnetic field profile with respect to a motor axis of the electromagnetic device by an angle $\alpha$.

In another embodiment, an electromagnetic device includes a rotor, a stator, and a near field plate. The rotor may include a rotor body and a plurality of radially extending rotor poles. The stator may include a plurality of stator poles radially extending inwardly from a stator body toward the rotor body. Each stator pole may have a magnetic flux generating device and a stator pole tip, wherein an air gap may be located between each stator pole tip and each corresponding rotor pole. The rotor is configured to rotate within the stator upon sequential energization of the magnetic flux generating device. The near field plate includes a spatially modulated surface reactance, and is coupled to an end face of at least one stator pole tip. The near field plate is configured to produce a magnetic field profile having at least one concentrated magnetic flux region proximate the stator pole tip within the air gap when an associated magnetic flux generating device is energized. The near field plate is configured to twist the magnetic field profile with respect to a motor axis by an angle $\alpha$ such that each rotor pole experiences at least a portion of the at least one concentrated magnetic flux region during 360 degree rotation of the rotor.

In yet another embodiment, a near field plate for a switched reluctance motor application includes a perimeter region having a first edge region opposite from a second edge region and a third edge region opposite from a fourth edge region, and a plurality of conductive loops extending between the third edge region and the fourth edge region. The conductive loops are angled at an angle $\alpha$ with respect to the first edge region and the second edge region, such that the conductive loops provide a spatially modulated surface reactance and modify magnetic flux passing therethrough to produce a magnetic flux profile having at least one concentrated magnetic flux region. The near field plate twists the magnetic flux profile by the angle $\alpha$ with respect to the first edge region and the second edge region. The near field plate is configured to generate the magnetic flux profile from magnetic flux resulting from an alternating signal at a frequency that is less than 100 kHz.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to electromagnetic devices and near field plates wherein a magnetic field is manipulated in three dimensions to reduce torque ripple. By angling the magnetic field distribution, and thus manipulating the three dimension magnetic field, it is hypothesized that the motor torque ripple can be reduced by creating a reasonably sustained higher torque field throughout a full 360 degree rotor rotation angle.

Embodiments of the present disclosure are described in the context of electromagnetic devices, such as motors, and in particular, switched reluctance motors having one or more magnetic field focusing devices. The magnetic field focusing device may be operable to manipulate the magnetic field distribution at an air gap between stator and rotor poles of the electromagnetic device. In one embodiment, the magnetic field focusing devices are configured as near field plates positioned at the tip of each stator pole, so as to manipulate the magnetic field produced by a stator coil. In another embodiment, the magnetic field focusing devices are configured as shaped magnetic elements. Various embodiments of electromagnetic devices and near field plates are described in detail below.

Figure 1:
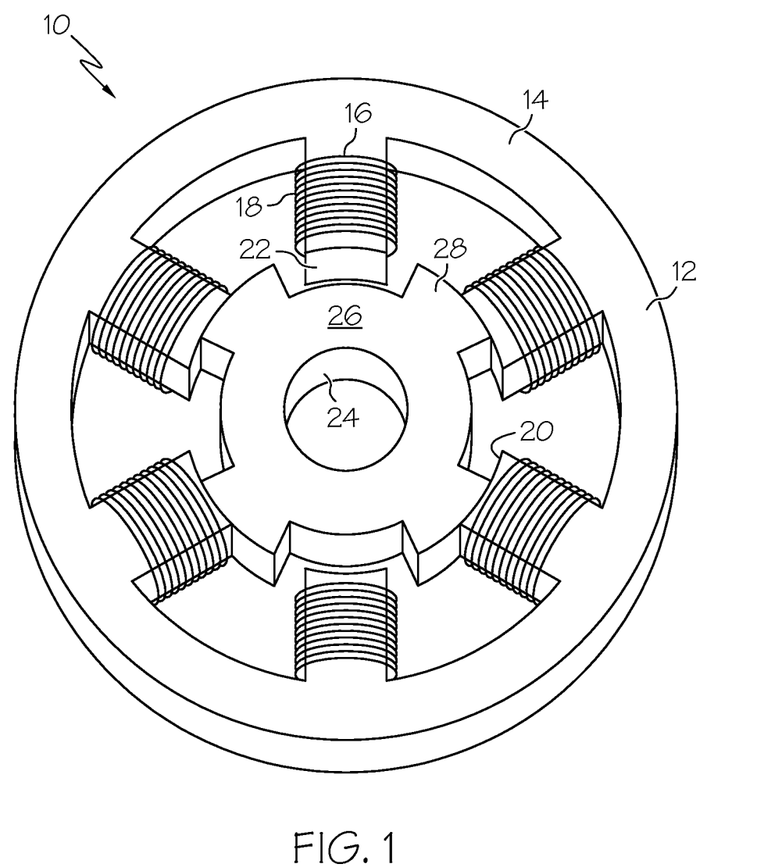
FIG. 1 depicts a schematic illustration of an exemplary switched reluctance motor having a near field plate couple to a stator pole according to one or more embodiments described and illustrated herein.

FIG. 1 schematically depicts an electromagnetic device configured as a switched reluctance motor 10 comprising a stator 12 including an annular stator body 14 and stator poles 16 extending inwardly from the stator body 14. Each stator pole 16 has a stator pole tip 20, and a magnetic flux generating device, such as a stator coil 18, which may be wound around each stator pole 16. A near field plate, such as near field plate 22, may be supported on one or more stator pole tips 20. The annular stator body 14 need not have a circular outer cross-section, but may be configured in any suitable arrangement for supporting the inwardly directed stator poles.

The motor also comprises a rotor 24 having a central rotor body 26 supporting a plurality of outwardly extending rotor poles 28. The rotor 24 is operable to rotate within the stator 12, for example on appropriate energization of the stator poles 16 by the stator coils 18. For illustrative clarity, FIG. 1 does not depict other possible components, such as a driveshaft turned by the rotor, for example.

In the illustrated embodiment, an end face of at least one stator pole tip 20 supports a near field plate 22, the near field plate 22 being configured to modify the magnetic flux distribution passing through the near field plate, so as to increase the torque and/or reduce the torque ripple of the switched reluctance motor 10. The near field plate 22 may be configured to provide one or more regions of increased flux density within a rotor pole, as the rotor pole passes proximate the stator pole. A near field plate 22 may effectively focus the magnetic field at one or more locations within a proximate rotor pole.

As the rotor 24 rotates within the stator 12, in some configurations a stator pole 16 and rotor pole 28 are proximate to one another and separated by an air gap. Magnetic flux generated by the stator coil(s) passes through the stator pole, and out of the stator pole tip 20 through the near field plate 22. The near field plate 22 focuses the magnetic field distribution so as to create regions of focused or concentrated flux density. The near field plate therefore may reduce the uniformity of the magnetic field at the rotor pole.

It is noted that although embodiments of the electromagnetic devices and the near field plates are described herein in the context of switch reluctance motors, embodiments are not limited thereto. The near field plates described herein may be utilized in any electromagnetic and/or electromechanical application in which magnetic field focusing is desirable. For example, near field plates may be used to focus magnetic fields for increasing the magnetic force on a moveable component (e.g., the plunger of an actuator, the rotor of an inductance motor, etc.). Electromagnetic devices or systems that embodiments of the near field plates described herein may be utilized include, but are not limited to, magnetic motors (e.g., a switched reluctance motor as may be used in devices such as air-conditioners, washing machines, etc.), spectrometers (e.g., a magnetic resonance spectrometer or imaging device), metal detectors, relays, loudspeakers, magnetic levitation devices, transformers, inverters, and transducers. Other applications in which embodiments of the near field plates may be used include power transmission systems, such as systems operating at 13.56 MHz or other operational frequencies.

As described below, the use of one or more magnetic field focusing devices that manipulate the magnetic flux distribution in three dimensions, such as near field plates or shaped elements, may allow for improvements in average torque and/or torque ripple of a motor in which they are implemented.

Figure 2:
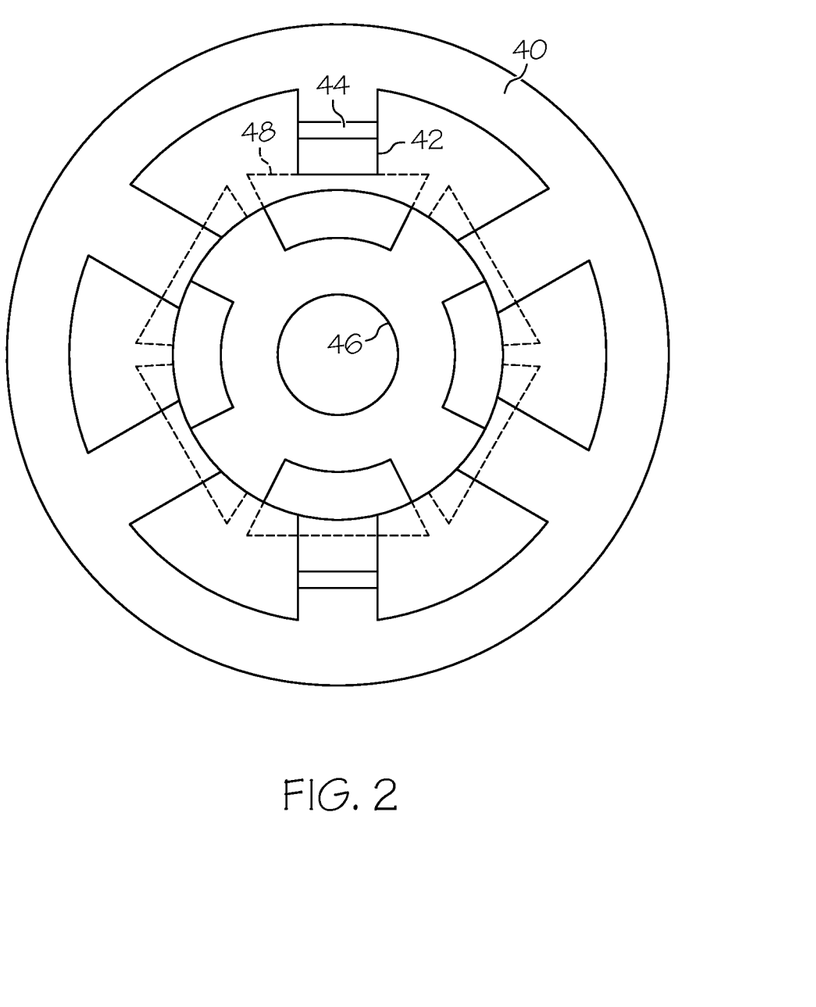
FIG. 2 depicts a schematic illustration of a simulated configuration of a method for optimizing the magnetic field distribution for the switched reluctance motor depicted in FIG. 1, according to one or more embodiments described and illustrated herein.

FIG. 2 schematically illustrates a geometry used for optimization of the magnetic field, and hence design of the near field plates 22. The simulated structure includes stator 40, stator pole 42, permanent magnet 44, rotor 46, and geometrical design domain 48. The dotted lines around the stator pole tip regions represent geometrical design domains which include a stator pole tip having a shaped element. Accordingly, the simulated structure of FIG. 2 may correspond closely to that of the apparatus to be optimized (such as the switched reluctance motor 10 depicted in FIG. 1), using a shaped element to represent the effect of the near field plates.

By optimizing the shaped elements on the stator pole tips, an improved field distribution may be determined. A near field plate may then be tailored to give any desired field distribution. As described below, near field plates that twist the magnetic field profile or distribution may be designed to further reduce torque ripple. The use of permanent magnets to replace the stator coils may allow geometry effects of the shaped elements to be removed from the simulation, thereby more closely representing the effect of the near field plates.

Figure 3A:
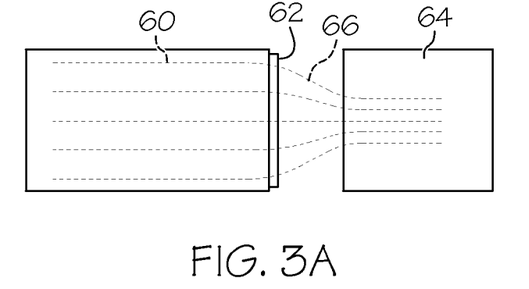
FIGS. 3A and 3B depict schematic illustrations of the focusing effect of a near field plate according to one or more embodiments described and illustrated herein.
Figure 3B:
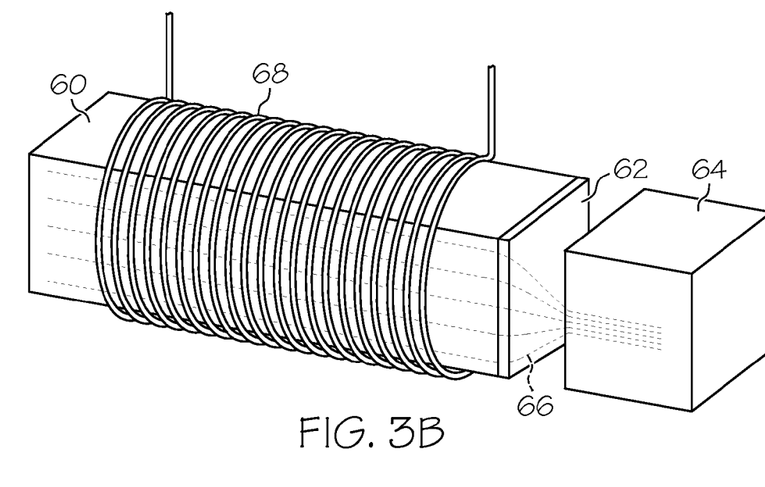
Figure 3C:
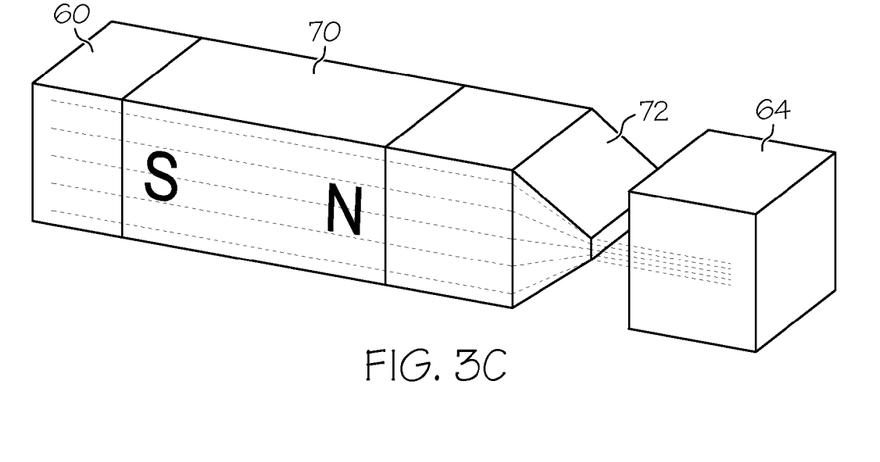
FIG. 3C depicts a schematic illustration of the focusing effect of a shaped element according to one or more embodiments described and illustrated herein.

FIGS. 3A-3C schematically illustrate the magnetic field focusing effect of an exemplary near field plate. FIG. 3A depicts a stator pole 60 having a stator pole tip supporting a near field plate 62. The near field plate may be thin compared to the geometrical extent of the stator pole 60. Field lines, indicated as dotted lines 66, are focused after passing through the near field plate 62 and are concentrated within a central region of the rotor portion 64. This illustration is generally true for any magnetic device, and may also represent an improved actuator component where element 60 represents the electromagnet of an actuator, and element 64 corresponds to the movable plunger of the actuator. However, for conciseness, the present examples are in the context of motors. Accordingly, magnetic focusing devices as described herein may be utilized in applications other than switched reluctance motors.

FIG. 3B is a similar configuration, in which the field lines are generated by an electromagnet in the form of a coil 68 disposed around element 60. The flux lines, shown as dotted lines 66, can be seen to concentrate within a central portion of the rotor element 64.

FIG. 3C further illustrates the novel design approach that may be used to obtain optimized field distributions. The electromagnet 68 in FIG. 3B is replaced by a permanent magnet 70, indicated by the letters S and N corresponding to south and north magnetic poles. In this example, the near field plate is replaced by shaped element 72. The flux lines propagate through the pole and are focused by shaped element 72 into the central portion of rotor portion 64. Optimization of the shaped element using a gradient-based approach allows the optimal field distribution to be determined. A near field plate or similarly shaped magnetic element can then be used to provide such a magnetic field distribution in an improved electromagnetic device.

In representative examples, a near field plate is configured to provide magnetic field focusing similar to that obtained using the shaped elements in the optimization process. Optimization of the shaped element allows the optimal field to be determined, and a near field plate can then be designed to provide that optimal field. In other examples, a magnetic field focusing device having a similar form to the optimized shaped element may be used in an improved switched reluctance motor. Additional information regarding optimization methods is described in U.S. patent application Ser. No. 13/028,712, filed on Feb. 16, 2011, which is hereby incorporated by reference in its entirety.

Figure 4A:
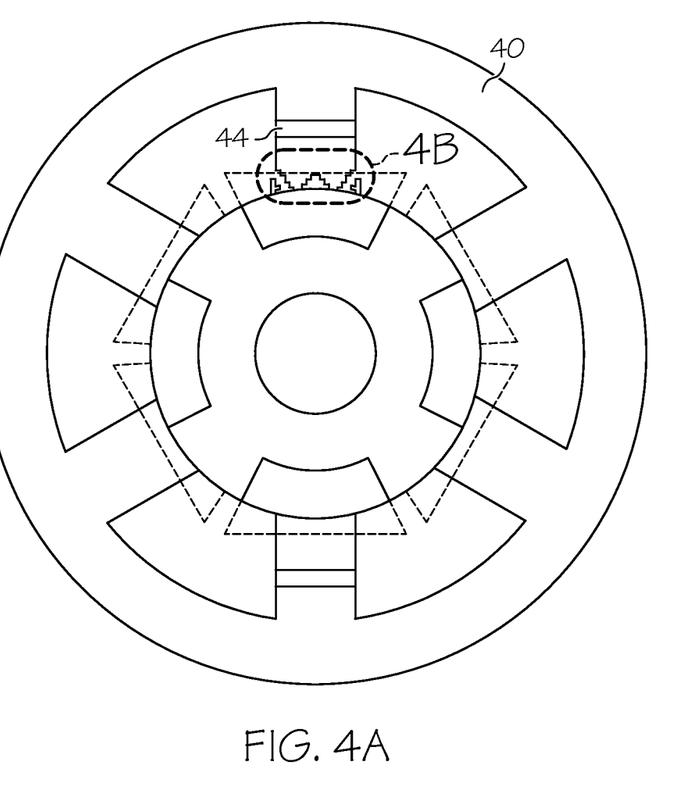
FIGS. 4A-4C depict an improved field distribution by two dimensional magnetic field manipulation by use of a near field plate according to one or more embodiments described and illustrated herein.
Figure 4B:
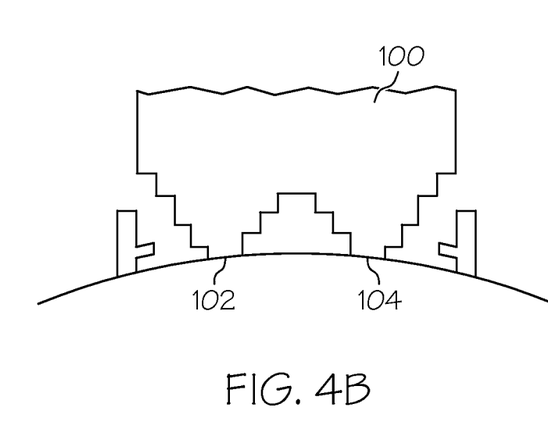

FIGS. 4A and 4B illustrate results of a design approach for a switched reluctance motor. In this example, similar to that shown in FIG. 2, the stator 40 includes a permanent magnet 44 corresponding to the stator coil within that particular stator pole. FIG. 4B shows an enlarged view of the shaped element 100, showing protruding portions 102 and 104. A near field plate may then be designed to give a field distribution similar to that represented by the optimized shaped element.

Figure 4C:
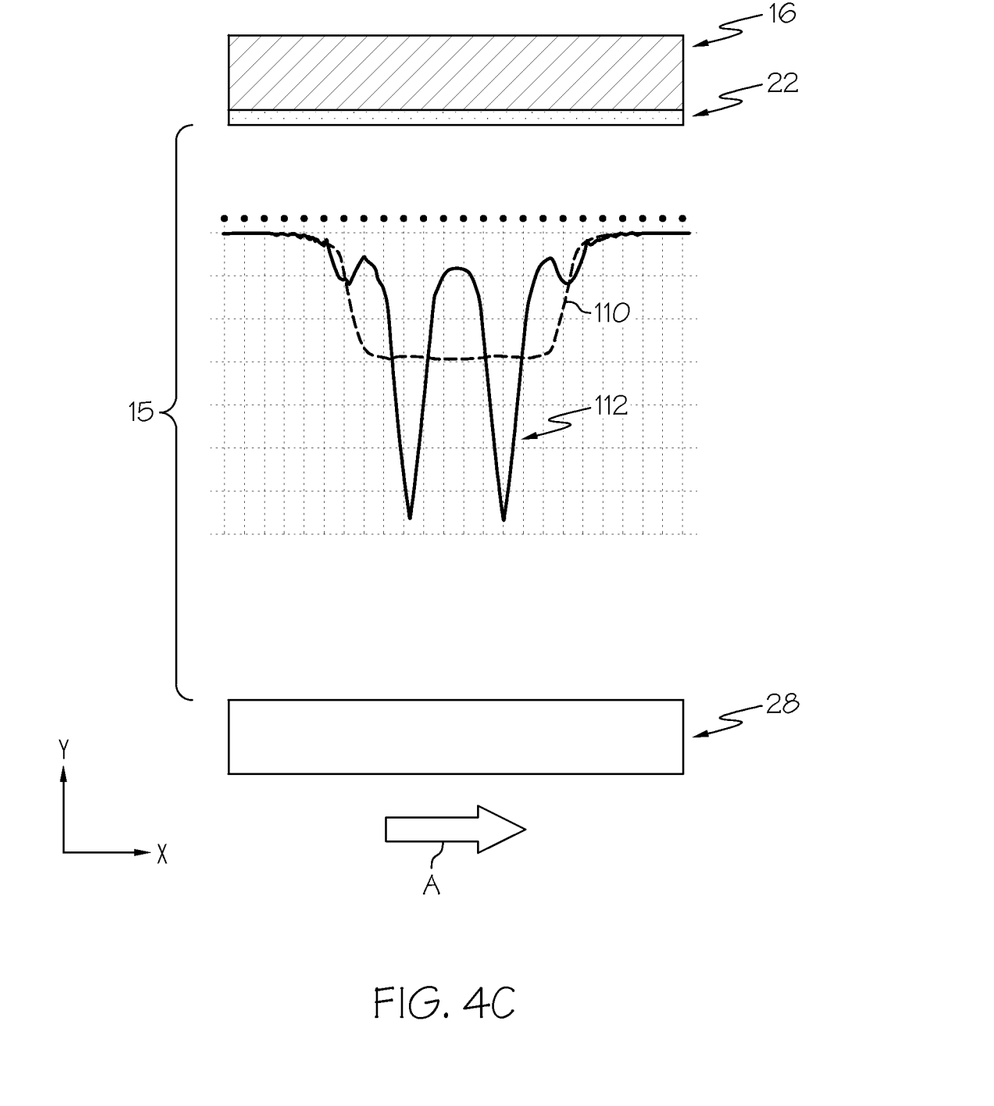

FIG. 4C depicts an exemplary field distribution obtained without a near field plate 110 (no focusing) and with a near field plate 112 (field focusing) that manipulates the magnetic field distribution in two dimensions. An air gap 15, which is exaggerated for illustration purposes, is located between the rotor pole 28 and a near field plate 22 coupled to a stator pole 16. The rotor rotates relative to the fixed stator as indicated by arrow A. As shown in FIG. 4C, the two dimensional magnetic field distribution does not vary as a function of out-of-plane distance. As described below, manipulating the magnetic field distribution or profile in three dimensions may further reduce torque ripple.

The near field plate may be a patterned, grating-like plate having sub-wavelength features. In some embodiments, the near field plate may comprise capacitive elements, a corrugated surface, or other configuration. Near field plates may focus electromagnetic radiation to spots or lines of arbitrarily small sub-wavelength dimensions.

Embodiments of the present disclosure contemplate and use near field plates to achieve focusing of low frequency (for example kilohertz) electromagnetic signals used in electromagnetic devices such as reluctance motors, rather than in high frequency signal applications where the diffraction limit is a problem to overcome. A near field plate is used to modify the magnetic field distribution at a movable rotor to achieve a greater magnetic torque on the rotor.

A near field plate may comprise patterned conducting elements (such as wires, loops, corrugated sheets, capacitive elements, inductive elements, and/or other conducting elements) formed on or otherwise supported by a dielectric substrate. In one embodiment, a near field plate has a surface impedance with sub-wavelength structure. The surface impedance structure, and hence pattern of conducting elements, may be determined using back-propagation methods from the desired field focusing properties, for example as described by U.S. Pub. No. 2009/0303154 to Grbic et al. A near field plate may include grating-like sub-wavelength structures. Other structures may include a circular corrugated surface, such as a grooved surface with a radial profile in the form of a Bessel function. The near field plate may be generally planar, or in other embodiments, may be curved to conform to a surface (e.g. a curved or other non-planar end surface of an electromagnet, e.g., the tip of a stator pole).

Figure 5A:
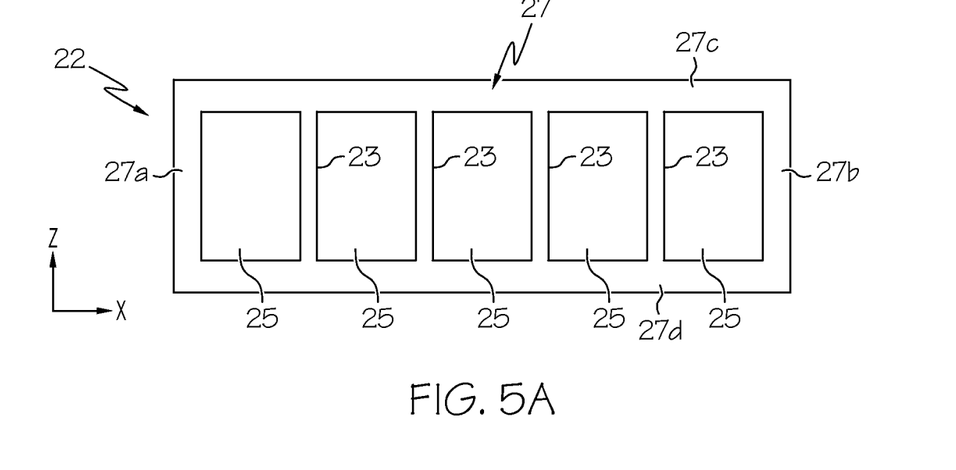
FIG. 5A depicts a schematic illustration of a near field plate for providing two dimensional magnetic field manipulation according to one or more embodiments described and illustrated herein.

Referring now to FIG. 5A, a near field plate 22 according to one embodiment is illustrated. The near field plate 22 generally comprises a sheet of electrically conductive material having a perimeter 27 with a first edge portion 27a, a second edge portion 27b, a third edge portion 27c and a fourth edge portion 27d, and a plurality of conductive loops 23 positioned therebetween. A gap 25 is located between each of the conductive loops 23. The actual configuration of the near field plate 22 may result from the optimization methods described above, and may be different from that depicted in FIG. 5A. The configuration of the near field plate 22 therefore provides a spatially modulated surface reactance to manipulate the magnetic flux distribution in two dimensions.

Figure 5B:
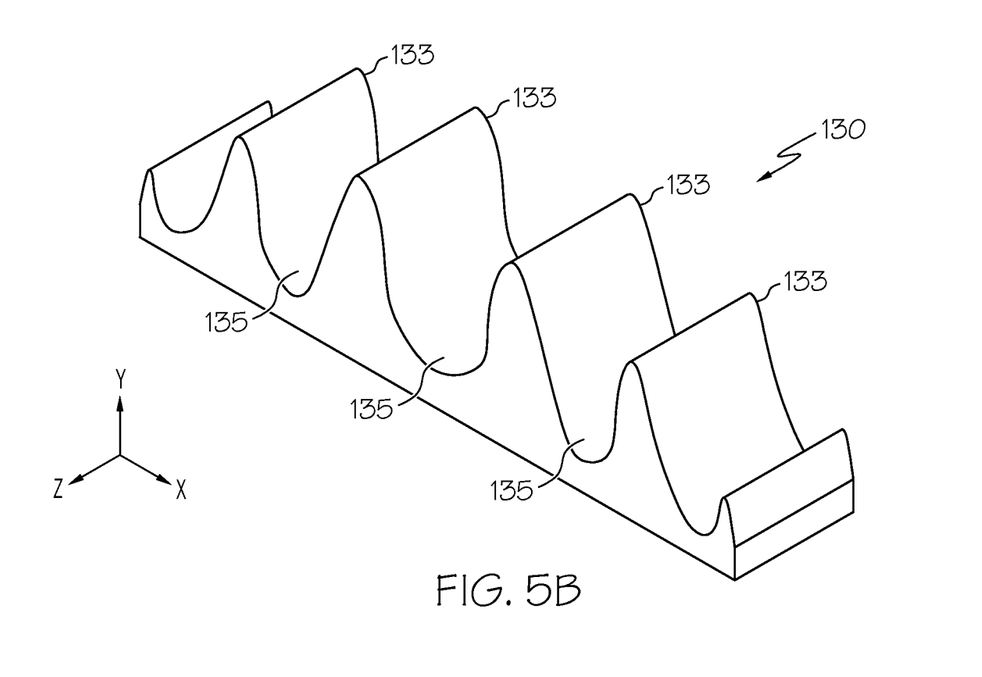
FIG. 5B depicts a representation of a magnetic field distribution provided by the near field plate depicted in FIG. 5A according to one or more embodiments described and illustrated herein.

FIG. 5B illustrates a magnetic field distribution 130 resulting from magnetic flux passing through the near field plate 22 depicted in FIG. 5A. The magnetic field distribution 130 has a plurality of concentrated magnetic flux regions 133 that are separated by valley regions 135 passing relatively little magnetic flux. It should be understood that the near field plate 22 may provide for more or fewer concentrated magnetic flux regions 133 depending on the application. As shown in FIG. 5B, the near field plate 22 only manipulates the magnetic field distribution in two dimensions (the x- and y-axes). The magnetic field distribution 130 does not vary along the motor axis (i.e., the z-axis).

Figure 6A:
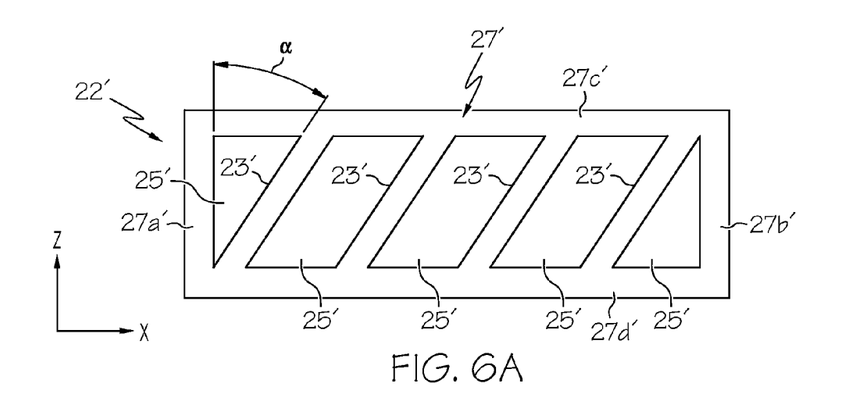
FIG. 6A depicts a schematic illustration of a near field plate for providing three dimensional magnetic field manipulation according to one or more embodiments described and illustrated herein.
Figure 6B:
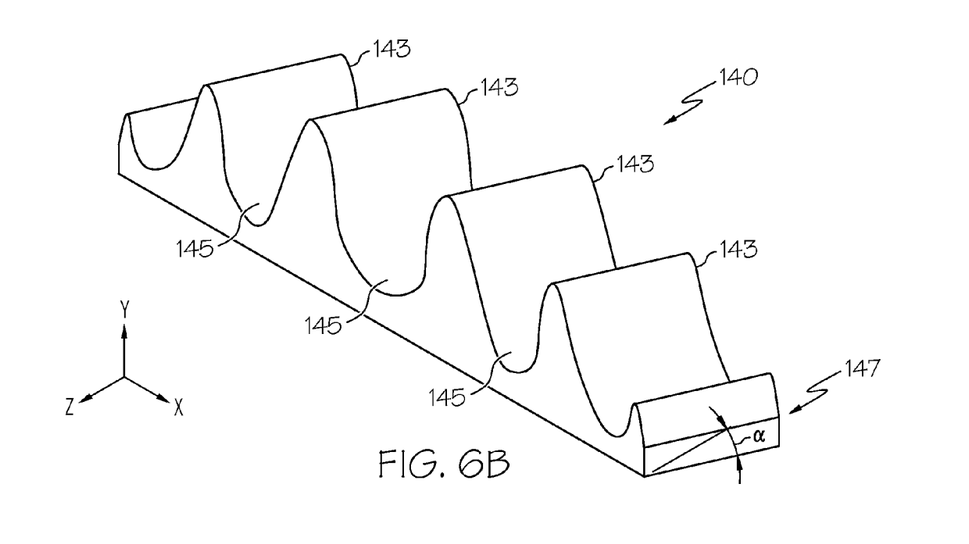
FIGS. 6B AND 6C depict a representation of a magnetic field distribution provided by the near field plate depicted in FIG. 6A according to one or more embodiments described and illustrated herein.

Referring now to FIG. 6A, a near field plate 22' configured to modify the magnetic field in three dimensions is illustrated. In this embodiment, the near field plate 22' comprises a sheet of electrically conductive material having a perimeter 27' with a first edge portion 27a', a second edge portion 27b', a third edge portion 27c' and a fourth edge portion 27d', and a plurality of angled conductive loops 23' positioned therebetween. The first and second edge portions 27a', 27b' are parallel with respect to the z-axis, which, when the near field plate 22' is installed on a stator pole tip, is parallel to the motor axis of the electromagnetic device. As shown in FIG. 6B, the conductive loops 23' are angled with respect to the z-axis by an angle α.

Figure 6C:
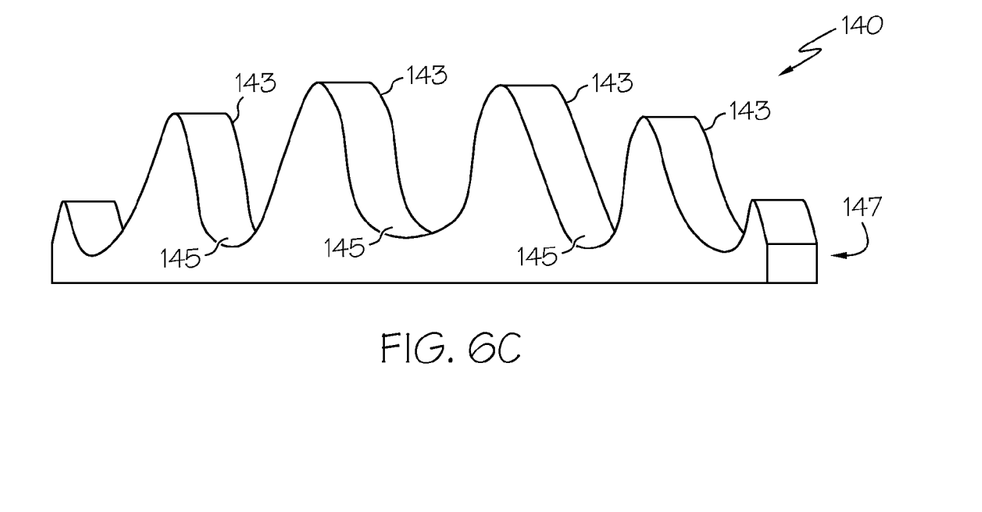

By angling the conductive loops, 23', the magnetic field is twisted or tilted with respect to the motor axis. The angle α may be dependent on the desired amount of twisting of the magnetic field. FIGS. 6B and 6C depict a top perspective view and a front view of a magnetic field distribution 140, respectively, resulting from magnetic flux passing through the near field plate 22' depicted in FIG. 6A. Similar to the magnetic field distribution 130 depicted in FIG. 5B, the magnetic field distribution 140 has a plurality of concentrated magnetic flux regions 143 that are separated by valley regions 145 passing relatively little magnetic flux. It should be understood that the near field plate 22' may provide for more or fewer concentrated magnetic flux regions 143 depending on the application. As shown in FIGS. 6B and 6C, the near field plate 22' with angled conductive loops 23' provides for three dimensional magnetic field manipulation as the magnetic field distribution 140 varies along the z-axis, as indicated by angle α near region 147 in FIG. 6B. In this manner, the magnetic field distribution 140 is twisted or tilted such that the rotor poles experience at least a portion of the concentrated magnetic flux regions 143 during 360 degree rotation of the rotor. This may provide a sustained higher average torque field throughout the motor rotor rotation angle.

Figure 7:
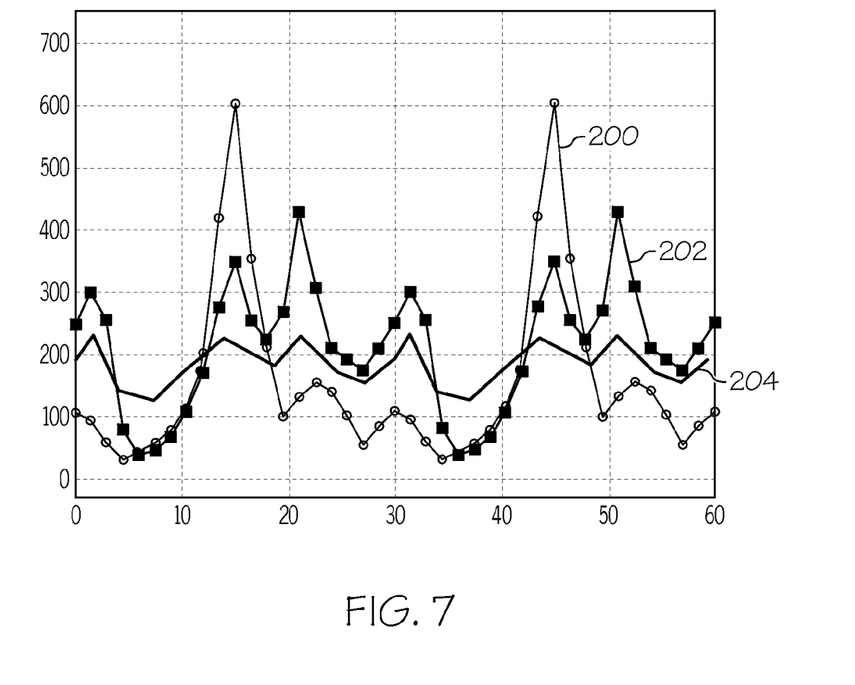
FIG. 7 depicts a graph of torque profile results for non-field focusing, two dimensional field focusing, and three dimensional field focusing.

FIG. 7 shows the torque versus rotor angle curve for the non-field focusing 200, two dimensional field focusing 202, and three dimensional field focusing 204 approaches, showing that the torque ripple may be reduced using a near field plate (or other magnetic field focusing device) to obtain field focusing in two or three dimensions. It is noted that the curve for three dimensional field focusing 204 is based on hypothetical results. The reduced torque ripple provided by three dimensional magnetic field focusing may be due to higher sustained field magnitude over the distance/angle of travel of the rotor.

It should now be understood that the embodiments described herein may reduce torque ripple in an electromagnetic device, such as a switched reluctance motor, by manipulating a magnetic field in three dimensions. In one embodiment, a near field plate may comprise angled conductive loops or regions that are operable to twist the magnetic field along an axis. The near field plates may be coupled to stator pole tips to produce regions of concentrated magnetic flux that are twisted or tilted with respect to a motor axis of the machine. The three dimensional, manipulated magnetic field distribution may provide a sustained higher average torque field throughout the motor rotor rotation angle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electromagnetic device comprising:
 a rotor comprising a rotor body and a plurality of radially extending rotor poles;
 a stator comprising a plurality of stator poles radially extending inwardly from a stator body toward the rotor body, each stator pole of the plurality of stator poles having a magnetic flux generating device and a stator pole tip associated therewith, wherein an air gap is located between each stator pole tip and each corresponding rotor pole, and the rotor is configured to rotate within the stator upon sequential energization of the magnetic flux generating device; and
 a magnetic field focusing device coupled to an end face of at least one stator pole tip that produces a magnetic field profile comprising at least one concentrated magnetic flux region proximate the stator pole tip within the air gap when an associated magnetic flux generating device is energized, the magnetic field focusing device configured to twist the magnetic field profile with respect to a motor axis of the electromagnetic device by an angle α.

2. The electromagnetic device of claim 1, wherein the magnetic field focusing device manipulates the magnetic field profile in three dimensions.

3. The electromagnetic device of claim 1, wherein the magnetic flux generating device comprises a stator coil wrapped around the stator pole.

4. The electromagnetic device of claim 1, wherein the magnetic field profile is twisted such that each rotor pole experiences at least a portion of the at least one concentrated magnetic flux region during 360 degree rotation of the rotor.

5. The electromagnetic device of claim 1, wherein the magnetic field focusing device is configured to produce a plurality of concentrated magnetic flux regions.

6. The electromagnetic device of claim 1, wherein the magnetic field focusing device comprises a near field plate comprising a spatially modulated surface reactance configured to produce the at least one concentrated magnetic flux region proximate the stator pole tip.

7. The electromagnetic device of claim 1, the magnetic flux generating device being sequentially energizable by an alternating signal source having a signal frequency in a range of 50 Hz to 100 kHz.

8. The electromagnetic device of claim 1, wherein the near field plate comprises a first edge, a second edge, and a plurality of conductive loops separated by a gap, each conductive loop of the plurality of conductive loops being angled with respect to the first and second edges by the angle α.

9. The electromagnetic device of claim 1, wherein the near field plate comprises a plurality of conductive loops separated by a gap, each conductive loop of the plurality of conductive loops being angled with respect to the motor axis by the angle α.

10. An electromagnetic device comprising:
 a rotor comprising a rotor body and a plurality of radially extending rotor poles;
 a stator comprising a plurality of stator poles radially extending inwardly from a stator body toward the rotor body, each stator pole of the plurality of stator poles having a magnetic flux generating device and a stator pole tip associated therewith, wherein an air gap is located between each stator pole tip and each corresponding rotor pole, and the rotor is configured to rotate within the stator upon sequential energization of the magnetic flux generating device; and
 a near field plate comprising a spatially modulated surface reactance coupled to an end face of at least one stator pole tip, the near field plate configured to produce a magnetic field profile comprising at least one concentrated magnetic flux region proximate the stator pole tip within the air gap when an associated magnetic flux generating device is energized, the near field plate configured to twist the magnetic field profile with respect to a motor axis by an angle α such that each rotor pole experiences at least a portion of the at least one concentrated magnetic flux region during 360 degree rotation of the rotor.

11. The electromagnetic device of claim 10, wherein the near field plate manipulates the magnetic field profile in three dimensions.

12. The electromagnetic device of claim 10, wherein the magnetic flux generating device comprises a stator coil wrapped around the stator pole.

13. The electromagnetic device of claim 10, wherein the near field plate is configured to produce a plurality of concentrated magnetic flux regions.

14. The electromagnetic device of claim 10, the magnetic flux generating device being sequentially energizable by an alternating signal source having a signal frequency in a range of 50 Hz to 100 kHz.

15. The electromagnetic device of claim 10, wherein the near field plate comprises a first edge, a second edge, and a plurality of conductive loops separated by a gap, each conductive loop of the plurality of conductive loops being angled with respect to the first and second edges by the angle α.

16. The electromagnetic device of claim 10, wherein the near field plate comprises a plurality of conductive loops separated by a gap, each conductive loop of the plurality of conductive loops being angled with respect to the motor axis by the angle α.

17. A near field plate for a switched reluctance motor application comprising:
a perimeter region comprising a first edge region opposite from a second edge region and a third edge region opposite from a fourth edge region;
a plurality of conductive loops extending between the third edge region and the fourth edge region and angled at an angle α with respect to the first edge region and the second edge region, wherein conductive loops provide a spatially modulated surface reactance and modify magnetic flux passing therethrough to produce a magnetic flux profile comprising at least one concentrated magnetic flux region such that the magnetic flux profile is twisted by the angle α with respect to the first edge region and the second edge region, and wherein the magnetic flux is produced by an alternating signal at a frequency that is less than 100 kHz.

18. The near field plate of claim 17, wherein each conductive loop of the plurality of conductive loops is separated by a gap.

19. The near field plate of claim 17, wherein the at least one concentrated magnetic flux region comprises four regions of concentrated magnetic flux.

20. The near field plate of claim 17, wherein the near field plate manipulates the magnetic flux in three dimensions.

* * * * *